Nov. 11, 1969
J. W. TALBOTT
3,477,485
METHOD FOR ASSEMBLING WOODEN "T" AND "I" BEAMS
Filed May 19, 1967
2 Sheets-Sheet 1
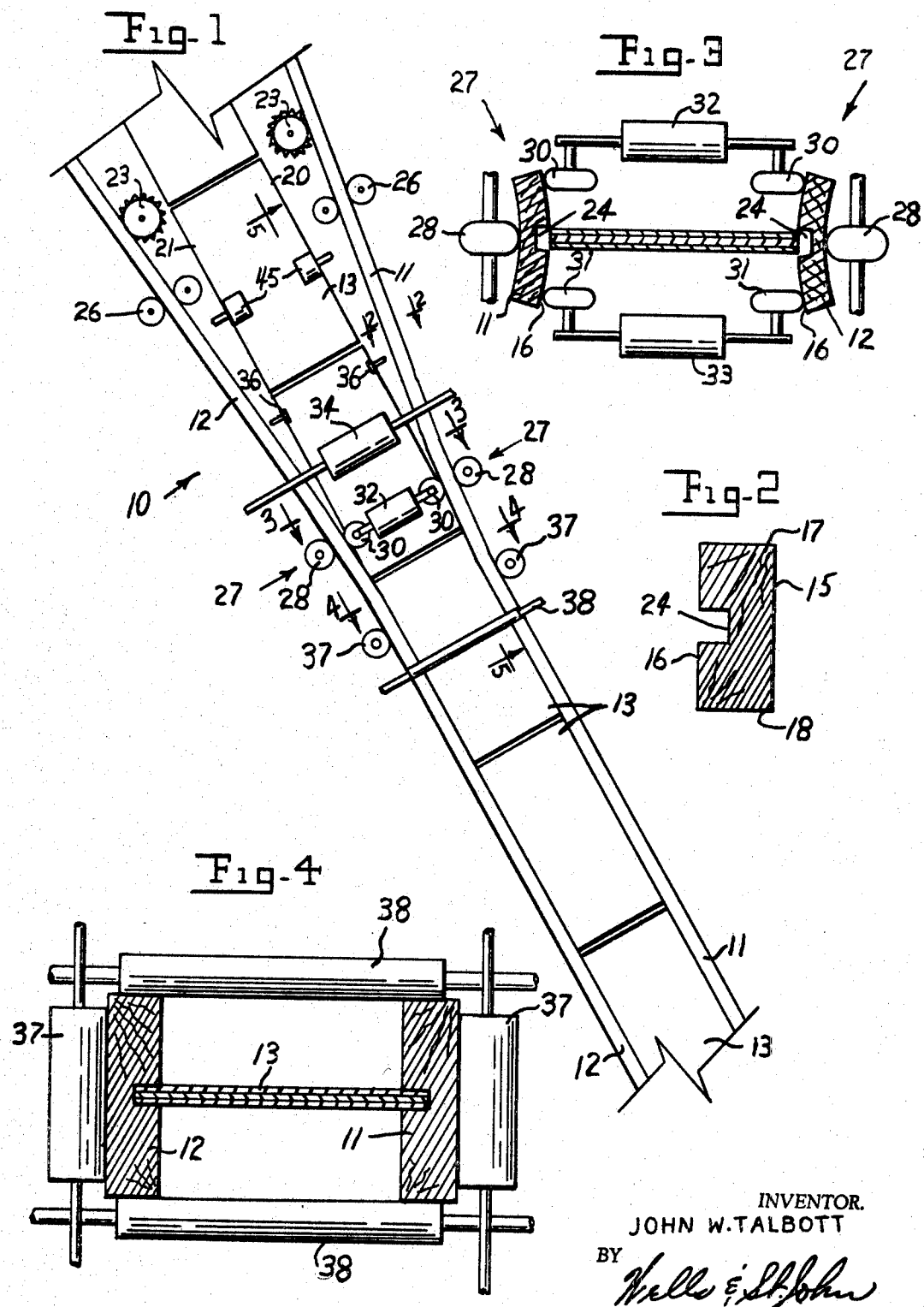
INVENTOR.
JOHN W. TALBOTT
BY
*Wells & St. John*
ATTYS.

Nov. 11, 1969   J. W. TALBOTT   3,477,485
METHOD FOR ASSEMBLING WOODEN "T" AND "I" BEAMS
Filed May 19, 1967   2 Sheets-Sheet 2
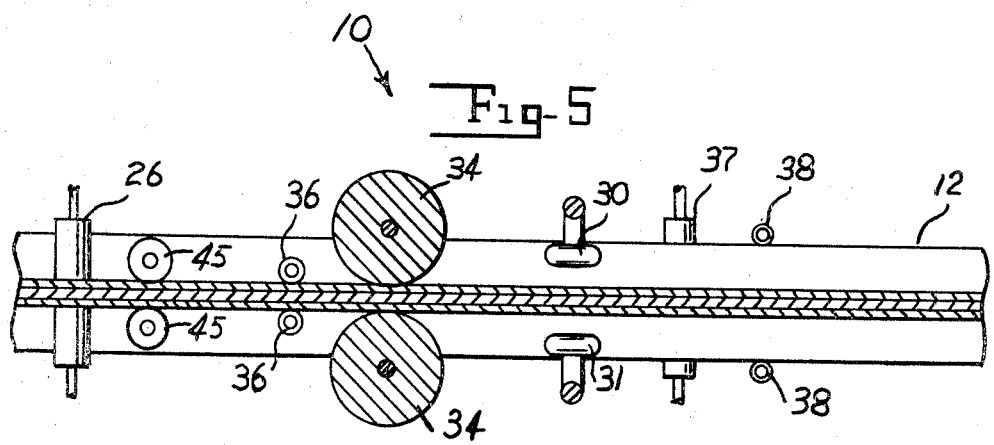
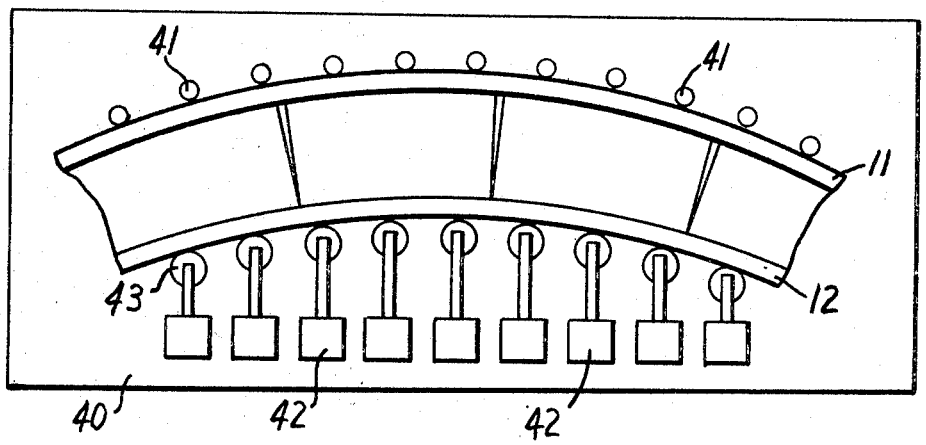
INVENTOR.
JOHN W. TALBOTT
BY
ATTYS.

United States Patent Office 3,477,485
Patented Nov. 11, 1969

3,477,485
METHOD FOR ASSEMBLING WOODEN T AND I BEAMS
John W. Talbott, Moscow, Idaho, assignor to Potlatch Forests, Inc., Lewiston, Idaho, a corporation of Delaware
Filed May 19, 1967, Ser. No. 639,731
Int. Cl. B27g 27/00
U.S. Cl. 144—319        10 Claims

ABSTRACT OF THE DISCLOSURE

The disclosure describes a method of assembling I beams having plywood, flake board or particle board webs. Initially two flange members are fed past saws to form longitudinal grooves in the inner faces of the flange members. Glue is applied to the upper and lower surfaces of the web member adjacent the side edges. Bending roller sets bend the flanges transversely to open up the grooves. The flanges are moved laterally to enclose the side edges in the grooves. As the flanges move past the bending roller sets the flanges spring back to close up the grooves and grasp the web edges to form an assembled beam.

Background of the invention

This invention relates to methods of assembling wood beams and more particularly to methods for assembling woden T and I beams having webs of plywood flake board or particle board.

There is a need in the construction industry, especially the residential and small commercial structures for light-weight beams having high strength to weight ratios. Not only must the beams be lightweight but the beams must be able to be economically manufactured and structurally sound.

The use of plywood, flake board or particle board as the web material in wooden T and I beams has many advantages that have been long recognized. However, the problem remained to economically manufacture wooden T and I beams having wood web members to complete with the traditional beam structures for roofs and floors of residential and small commercial structures.

Objects and summary of the invention

One of the principal objects of this invention is to provide a method of economically making wooden T and I beams having wood webs that are structurally sound.

An additional object of my invention is to provide a method of economically making T and I beams that does not use nails or other fasteners to fasten the wooden web to the wooden flange members.

A further object of my invention is to provide a method of economically making wooden T and I beams in which the joint itself develops the required pressure to maintain good contact while the glue is cured.

This invention concerns a method of making wooden T and I beams. First, longitudinal grooves are cut into the wooden flange members. Then the flange members are transversely bent to open up the grooves to receive the edges of the web members. The edges of the wood web members are inserted into the grooves. Subsequently, the flange members are released to close up the grooves to clamp the web edges therein. More particularly glue is applied to the web or the grooves prior to the insertion of the web edges into the flange grooves.

Brief description of the drawings

A preferred embodiment of the invention is illustrated in the accompanying drawings, in which:

FIG. 1 is a plan view of an assembly line that performs the principal steps of the method invention;

FIG. 2 is a cross sectional view taken on line 2—2 in FIG. 1 showing in cross section of a flange member with a longitudinal groove formed therein;

FIG. 3 is a cross sectional view taken on line 3—3 in FIG. 1 showing the flange member being transversely bent to open up the grooves;

FIG. 4 is a cross sectional view taken on line 4—4 in FIG. 1 showing the release of the flange members to close up the grooves and clamp the edges of the web members therein;

FIG. 5 is a cross sectional view taken on line 5—5 in FIG. 1;

FIG. 6 is a plan view of a fixture for assembling curved beams.

Description of the preferred embodiment

Referring in detail to the drawings an assembly line 10 is shown in FIG. 1 for making wooden beams having wood web members. Specifically, the assembly line 10 performs several operations to secure flange members 11 and 12 to a wood web member 13. This member preferably is of plywood, or flake board (a form of particle board wherein flakes of wood are overlapped and secured together by suitable glues).

Each of the flange members 11 and 12 has a wooden rectangular cross section as may be seen in FIG. 2. The flange members may be commercially available wooden structural boards such as 2 x 2's, 2 x 4's, or 2 x 6's, etc., in which all of the wooden fibers of the boards are parallel with the length of the boards. Each of the flange members has sides 17 and 18 and an outer face 15 and an inner face 16. The web members 13 have side edges 20 and 21.

Initially the flange members are set on edge so that the inner faces 16 of the flange members 11 and 12 are facing one another. The flange members 11 and 12 are then fed past horizontal saws 23 that form longitudinal grooves 24 having rectangular cross sections in the inner faces 16 of the flange members. The width of each of the rectangular grooves 24 is equal to or slightly less than the thickness of the wood web members 13. For greater pressure on the glue line the groove width is slightly less than the wood thickness. After the grooves are formed in the flange members, feed rollers 26 move the flange members 11 and 12 in generally converging paths along the assembly line to sets 27 of bending rollers. Each set 27 has a fixed outer roller 28 that is horizontally aligned with the groove 24 as shown in FIG. 3 for engaging the outer face 15 of the flange member. Each set has two inside rollers 30 and 31 for engaging the inner face 16 of the flange member on the opposite sides of the groove. The upper inner rollers 30 are connected to a fluid operated actuator 32. The lower inner rollers 31 are connected to a fluid operated actuator 33. When the fluid operated actuators 32 and 33 are pressurized the inside rollers 30 and 31 move outwardly against the inner face 16 of each flange member 11 and 12 to transversely bend the flange member about the outer roller 28 to open up the grooves 24 as may be seen in FIG. 3. It is contemplated that stationary rollers, that may be adjusted, may be used instead of the hydraulically operated rollers 30 and 31.

The web members 13 are successively fed horizontally along the assembly line between the flange members 11 and 12 by feed rollers 34. A suitable adhesive such as phenolic resin, resorcinol or casein glue is applied to the upper and lower surfaces of the web members near the edges 20 and 21 by glue spreader rollers 35 and 36 respectively.

Immediately after passing the bending roller sets 27, the flange members converge on the centrally fed web members with the web edges 20 and 21 entering the opened flange grooves 24. When the web edges come into contact with the flanges at the base of the grooves 24, the flange members begin to flare out into parallel relationship with the web members. As the flange and web members continue to move in parallel paths the flange members 11 and 12 spring back to a substantially unstressed condition to close up the rectangular grooves 24 and grasp the edges of the web members therein to form an I beam. The assembled I beam is supported on conveyor rollers 38 and laterally aligned by vertical rollers 37.

Since the widths of the rectangular grooves 24 are no greater than the thickness of the web members 13, the flange members exert a clamping pressure on the web surfaces to maintain intimate contact of the surfaces during the curing of the glue to form structurally sound joints. In this manner no external pressure is required to effectively hold the surfaces in engagement during curing of the glue.

If it is desired to form a curved wooden I beam, the assembled beam as it leaves the assembly line 10 may be positioned in a fixture 40. The fixture 40 has a plurality of pins 41 that are arranged in a curved path having a desired camber. A plurality of fluid operated actuators 42 are mounted on the fixture 40 opposing the pins 41. Pressure rollers 43 are connected to the ends of the actuators. The assembled beam is positioned between the pressure rollers 43 and the pins 41. The actuators 42 are pressurized to move against the flange member 12 to bend the flange members 11 and 12 longitudinally as shown in FIG. 5. If the camber is quite shallow, the side edges 20 and 21 of the web members need not be curved to conform with the camber. However, to assemble beams having a substantial camber, the side edges 20 and 21 of the web members should be curved to the desired curvature prior to the insertion into the grooves 24.

To make T beams, one of the flange members 11 or 12 may be entirely deleted or one flange member may have a substantially smaller cross section as compared to the other. For example, utilizing the above described method a T beam having a 2 x 2 flange member and a 2 x 6 flange member may be joined to the intermediate web member.

Because of variations in the actual thickness of nominal sized plywood it may be necessary to cut or sand the upper and lower surfaces of the plywod web 13 near the edges 20 and 21 prior to the application of the glue. Sanding heads 45 are shown in FIG. 1 upstream of the feed rollers 34 for sanding the upper and lower surfaces of the web to insure a uniform thickness.

It is also within the contemplation of this invention that the glue instead of being applied to the wood web may be applied to the sides of the grooves 24 prior to the joining of the components.

It should be appreciated that the apparatus required to perform the steps in making the wooden beams is quite simple and economical to construct. The above described method is particularly adaptable for mass production of various length beams. Consequently, the cost of manufacturing such beams is quite low.

What I claim is:

1. A method of making a unitary wooden beam from a wooden board flange member composed entirely of wood fibers parallel with the length thereof and a wooden web member, comprising the steps of:
    (a) cutting a groove in one of the surfaces of the flange member parallel with the wood fibers;
    (b) transversely bending the flange member to open up the longitudinal groove;
    (c) inserting the edge of the web member into the opened up groove; and
    (d) releasing the flange member for permitting the flange member to spring back to close up the groove and clamp the web member edge therein to form a unitary woden beam.

2. The method as defined in claim 1 further comprising the step of applying glue to the surfaces adjacent one edge of the web member prior to the insertion of said edge into the groove.

3. The method as defined in claim 1 wherein the wooden flange member is rectangular in cross section and wherein a longitudinal groove is cut in one of the flange faces equidistant from the flange sides and wherein further the web member is inserted into the groove in a direction perpendicular to the flange member.

4. The method as defined in claim 3 wherein a first and second force are applied to the grooved flange face on opposite sides of the groove and wherein a third force is applied to the other flange face opposing and intermediate the first and second forces to transversely bend the flange member to open up the groove.

5. A method for making a wooden I beam from two 2 x 4 boards, comprising the steps of:
    (a) cutting a longitudinal groove in each of two 2 x 4 boards;
    (b) transversely bending the 2 x 4 boards to open up the longitudinal grooves;
    (c) inserting the side edges of the web member into the opened up grooves; and
    (d) releasing the 2 x 4 boards to cause the flange members to spring back and close up the longitudinal grooves and clamp the web member edges therein to form a wooden I beam.

6. The method as defined in claim 5 further comprising the step of applying glue to the surfaces adjacent the edges of the web member prior to inserting into the grooves.

7. The method as defined in claim 5 wherein the longitudinal grooves are cut in the respective inner faces of the 2 x 4 boards equidistant from the sides.

8. The method as defined in claim 7 wherein the web member is inserted into the grooves by positioning the web member perpendicular between the 2 x 4 boards and aligned with the grooves and moving the 2 x 4 boards into engagement with the web member with the grooves receiving the web edges.

9. The method as defined in claim 7 wherein the 2 x 4 boards are transversely bent to open up the grooves by applying a first and second force to the inner face of each 2 x 4 boards on opposite sides of the groove and applying a third force to the outer face of each 2 x 4 boards opposing and intermediate the first and second forces.

10. A method of making wooden unitary curved I beams from two wooden board flange members in which all of the wood fibers of the flange members are parallel with the length thereof, and a wooden plywood web member, comprising the steps of:
    (a) cutting a groove in one surface of each of the flange members parallel with the wood fibers;
    (b) transversely bending the flange members to open up the grooves;
    (c) applying glue to the surfaces adjacent the edge of the plywood web members;
    (d) inserting the side edges of the plywood web member into the opened up grooves;
    (e) releasing the flange members to cause the flange members to spring back and close up the grooves to clamp the edges of the plywood web member therein;
(f) longitudinally bending the flange members to the desired curvature before the glue cures; and
(g) curing the glue while the flange members are so bent to form a unitary curved I beam.

References Cited

UNITED STATES PATENTS 1,565,147  12/1925  Herschede et al.

FOREIGN PATENTS 483,543  5/1952  Canada.
1,207,588  12/1965  Germany.

GERALD A. DOST, Primary Examiner

U.S. Cl. X.R.

29—155; 144—322; 156—268; 287—20.92